United States Patent

[15] 3,647,228

Cassidy

[45] Mar. 7, 1972

[54] CERAMIC REGENERATOR SEALS

[72] Inventor: Donald J. Cassidy, Plymouth, Mich.

[73] Assignee: Ford Motor Company, Dearborn, Mich.

[22] Filed: July 9, 1970

[21] Appl. No.: 53,616

[52] U.S. Cl.................277/96, 277/235 A, 237/DIG. 6, 117/129
[51] Int. Cl.................................................F16j 15/54
[58] Field of Search..............277/235 A, 96, DIG. 6; 165/9; 117/105.2, 129, 100 B

[56] References Cited

UNITED STATES PATENTS

| 3,407,866 | 10/1968 | Sawchuk | 165/9 |
| 3,368,612 | 2/1968 | Brummet | 277/96 X |
| 3,120,919 | 2/1964 | Gardiner | 277/96 X |

*Primary Examiner*—Samuel B. Rothberg
*Attorney*—John R. Faulkner and Glenn S. Arendsen

[57] ABSTRACT

A monolithic seal member made of zinc oxide is positioned in the housing of a gas turbine engine where the seal member rubs against a rotating ceramic regenerator. The seal member has excellent friction and thermal shock characteristics that make it uniquely suited for use in the gas turbine engine. Adding small amounts of calcium fluoride to the seal member reduces the coefficient of friction without changing significantly the thermal shock characteristics. The zinc oxide also can be applied as a coating to a ceramic substrate.

6 Claims, 1 Drawing Figure

PATENTED MAR 7 1972 3,647,228
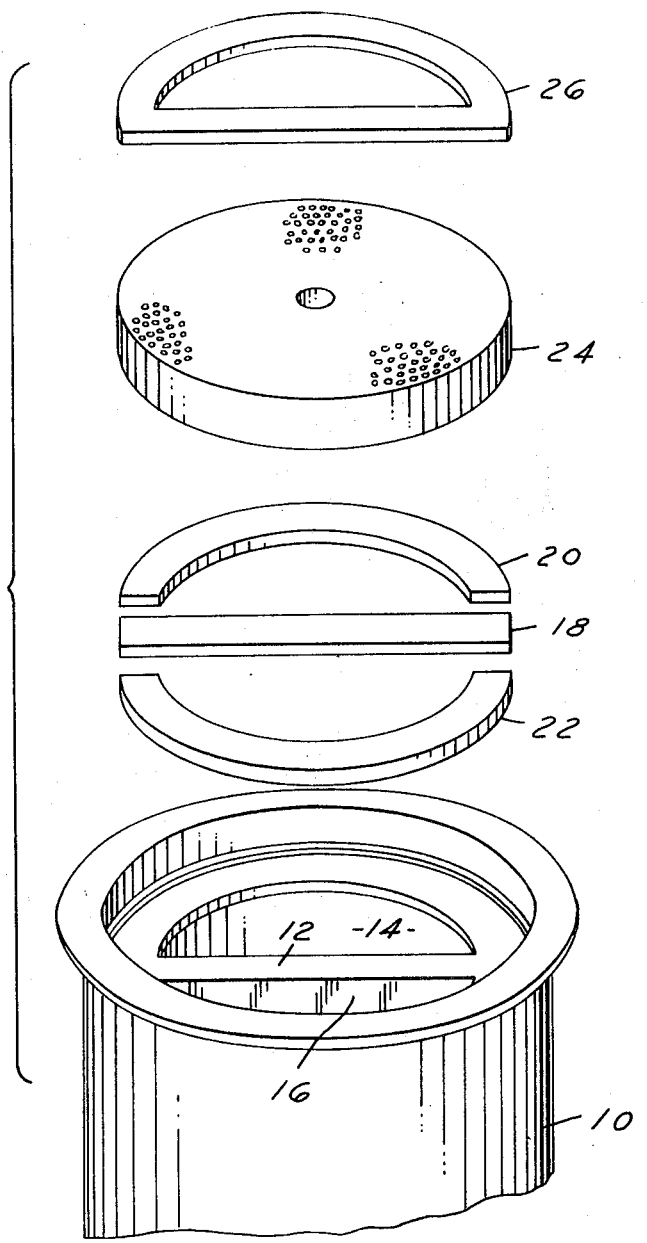
INVENTOR
DONALD J. CASSIDY
BY
John R. Faulkner
Glenn S. Arendsen
ATTORNEYS

CERAMIC REGENERATOR SEALS

SUMMARY OF THE INVENTION

This application relates to the subject matter of U.S. Pat. applications Ser. No. 854,397, filed Sept. 2, 1969 and Ser. No. 872,328, filed Oct. 29, 1969, now U.S. Pat. No. 3,601,414.

In addition to friction and wear properties, seals for the ceramic regenerator of a gas turbine engine must be able to withstand considerable temperature gradients during steady-state operation and rapid temperature increases during engine startup. Such temperature increases or thermal shocks arise from the fact that engine temperatures can increase from ambients of below zero to approximately 1,800° F. within about 3 seconds. Seals made by coating metallic substrates with friction and wear reducing compositions are fairly satisfactory, but the repeated thermal shocks and temperature gradients tend to separate the coatings from the substrate.

Continuing efforts to improve the life of regenerator seals resulted in the exclusively ceramic seal member of this invention. The seal members have an exceptionally good combination of wear, friction and thermal properties. A monolithic seal member consisting essentially of structurally integral zinc oxide can be produced inexpensively and has thermal properties that include excellent thermal shock resistance and ability to retain dimensional shape under significant temperature gradients. Wear and friction properties are improved by adding small amounts of ceramic halogenic salts. Such zinc oxide materials also can be applied as coatings to substrates made of other ceramic materials.

The seal members are located nonrotatably in the housing of the gas turbine engine where the rotating ceramic regenerator slides against surfaces thereof. An isostatic pressing process preferably is used to manufacture the monolithic seal members. Powdered zinc oxide having an initial particle size of about one micron is mixed with any additional ingredients and prereacted in air at 2,500° F. for about 2 to 3 hours. The resulting material is crushed and ball milled to a powder having a uniform particle size of about 4 microns. A binder is added to the powder and the mixture is granulated and isostatically pressed into the shape of the monolithic seal member. After pressing, the seal member is heated to about 600° F. to burn out the binder and then is sintered at about 2,000°–2,600° F. to form a seal member having a density of 60 to 100 percent of theoretical. Monolithic seal members having a density within the range of 75–95 percent of theoretical have the best combination of strength and wear properties.

BRIEF DESCRIPTION OF THE DRAWING

The FIGURE is an exploded view of the regenerator portion of a gas turbine engine showing the structure and location of several monolithic seal members made according to this invention.

DETAILED DESCRIPTION

Referring to the drawing, the regenerator portion of a gas turbine housing 10 contains a diagonal wall 12 that divides its interior into two semicircular gas flow passages 14 and 16. A cross arm seal 18 fits nonrotatably on top of wall 12 and two C seals 20 and 22 surround the outer peripheries of passages 14 and 16 respectively.

A disc-shaped ceramic regenerator 24 is mounted rotatably on top of seals 18, 20 and 22. A D-shaped seal 26 rests on top of regenerator 24 and is held in place by a cap member (not shown).

Disc 24 is rotated by accessory drive components of the engine in the conventional manner. Air from the engine compressor passes through the segment of disc 24 that subtends passage 16 and through passage 16 to the engine combustion chamber. Hot exhaust gases from the turbine wheel or wheels pass through passage 14, the segment of disc 24 above passage 14 and the space defined by D seal 26 into an exhaust passage defined by the cap. Disc rotation transfers heat from the hot exhaust gases to the cooler air.

Each of seal members 18, 20 and 22 is an exclusively ceramic member consisting essentially of structurally integral zinc oxide. Seal member 26 can be made of the same material but it generally does not encounter temperatures necessitating the excellent thermal properties. Seal members made entirely of zinc oxide exhibit a coefficient of friction of less than about 0.5 when rubbing against a ceramic regenerator at temperatures between 1,200° and 1,800° F. The thermal shock properties and the ability to withstand temperature gradients of the seals greatly exceeds previous coated metal seal members.

Adding up to 40 percent of a halogenic salt of calcium, potassium, magnesium, cerium, barium and strontium reduces the coefficient of friction of the seal members without significantly affecting the thermal shock properties. About 20–30 percent of the halogenic salt provides the best friction reductions. Particularly useful salts are calcium fluoride and potassium chloride, which provide the best combination of friction, wear and strength.

A powder pressing operation can be used to manufacture the monolithic seals of this invention. Powdered zinc oxide is mixed with any additional ingredients and prereacted at a temperature of about 2,500° F. to reduce thermal shrinkage. The reaction product is crushed to about 20 mesh in a hammer mill and then ball milled for about 16 hours or until the product reaches a relatively uniform particle size of about 4 microns. A wax emulsion binder that consists of about 40 percent by weight of wax in water is added to the powder and the mixture is granulated in a blender. Granulation assists in reducing compaction during the actual pressing operation.

The granulated material is placed in an isostatic or dry press and pressed into the desired shape using pressures of about 10,000 p.s.i. After pressing, the seal member is heated to burn out the binder and then is sintered at a temperature of about 2,000°–2,600° F. to produce a structural integral monolithic seal member. The seal member then is ground to final dimensions if necessary. Surface finishing techniques generally are not required but can be used to improve initial mating characteristics.

Seals intended for use at a relatively low temperature preferably are sintered in the higher portion of this range while seals intended for use at higher temperatures of about 1,800° F. can be sintered anywhere within the range. Sintering temperature and operating temperature apparently combine to produce final seal compositions having the desired frictional properties.

Useful seals also can be produced by flame spraying or painting the zinc oxide material directly onto other ceramic materials such as aluminum oxide, silicon nitride, silicon carbide, lithium aluminum silicate, or mullite (aluminum silicate). Such other ceramic materials serve as substrates for the coating of the zinc oxide material to provide an exclusively ceramic seal member having excellent thermal properties.

In an alternate slip casting process, water is added to the product of the hammer mill and the mixture is ball milled under wet conditions to an extremely fine particle size. The resulting mixture is slip cast into the desired seal shape and dried by heating the resulting member to a temperature of about 150°. Sintering then is carried out in the same manner as the dry pressing operation and can be followed by grinding the resulting product to final shape.

Thus this invention provides structurally integral seal members made exclusively of ceramic materials for gas turbine regenerators. The seal members can be monolithic or can comprise a zinc oxide coating on other ceramic substrates.

I claim:

1. In a gas turbine engine having a ceramic regenerator mounted for rotation relative to an engine housing, a sliding seal for said regenerator comprising an exclusively ceramic seal member consisting essentially of structurally integral zinc oxide, said member being nonrotatably located in said housing to slide against said regenerator when said engine is operating.

2. The gas turbine engine of claim 1 in which the seal member contains up to about 40 weight percent of a halogenic salt intimately dispersed throughout said zinc oxide.

3. The gas turbine engine of claim 2 in which the halogenic salt is calcium fluoride or potassium chloride.

4. The gas turbine engine of claim 3 in which the seal member is monolithic and has a density of 75 to 95 percent of theoretical density.

5. The gas turbine engine of claim 1 comprising a ceramic substrate for said zinc oxide of aluminum oxide, silicon nitride, silicon carbide, lithium aluminum silicate, or aluminum silicate.

6. The gas turbine engine of claim 1 in which the seal member is a monolithic member made from sintered zinc oxide, said monolithic member having a density of at least 60 percent of theoretical.

* * * * *